(12) United States Patent
Srinivasan et al.

(10) Patent No.: US 10,496,651 B2
(45) Date of Patent: Dec. 3, 2019

(54) USER RECOMMENDATION GENERATION

(71) Applicant: FUJITSU LIMITED, Kawasaki-shi, Kanagawa (JP)

(72) Inventors: Ramya Malur Srinivasan, Sunnyvale, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 799 days.

(21) Appl. No.: 15/143,342

(22) Filed: Apr. 29, 2016

(65) Prior Publication Data

US 2017/0316008 A1 Nov. 2, 2017

(51) Int. Cl.
| | |
|---|---|
| *G06F 16/2457* | (2019.01) |
| *G06N 20/00* | (2019.01) |
| *G06F 17/16* | (2006.01) |
| *G06N 7/00* | (2006.01) |
| *G06Q 30/06* | (2012.01) |

(52) U.S. Cl.
CPC ........ *G06F 16/24578* (2019.01); *G06F 17/16* (2013.01); *G06N 7/005* (2013.01); *G06N 20/00* (2019.01); *G06Q 30/0631* (2013.01)

(58) Field of Classification Search
CPC ... G06F 16/24578; G06F 17/16; G06N 20/00; G06N 7/005; G06Q 30/0631
USPC .......................................................... 707/749
See application file for complete search history.

(56) References Cited

U.S. PATENT DOCUMENTS

2009/0307296 A1* 12/2009 Gibbs .................... G06Q 30/02
709/201
2014/0156231 A1 6/2014 Guo et al.

FOREIGN PATENT DOCUMENTS

WO 2012155329 A1 11/2012
WO 2015/188349 A1 12/2015

OTHER PUBLICATIONS

Linden et al, "Amazon.com Recommendations; Item to Item Collaborative Filtering," Industry Report, IEE Internet Computing, Jan. 2003.
Koren et al, "Matrix Factorization Techniques for Recommender Systems," IEEE Computer Society Press, pp. 30-37, vol. 42, No. 8, Aug. 2009.

(Continued)

*Primary Examiner* — Pierre M Vital
*Assistant Examiner* — Andalib F Lodhi
(74) *Attorney, Agent, or Firm* — Maschoff Brennan

(57) ABSTRACT

A method may include generating a personalized rating vector associated with a querying user. The personalized rating vector may relate personalized ratings to options. The personalized rating vector may be generated via elementwise multiplication of a user vector, a relevance weight, and a characteristics vector. The user vector may relate user ratings to the querying user and to the options. The relevance weight may be associated with a characteristic of the querying user. The characteristics vector may relate characteristics ratings to a user characteristic and to the options. The user characteristic may correspond at least in part to the characteristic of the querying user. The method may further include generating a recommendation for the querying user based at least in part on the personalized rating vector, the recommendation associated with at least one option of the options of the personalized rating vector.

18 Claims, 4 Drawing Sheets

(56) References Cited

OTHER PUBLICATIONS

Singh A.P. and Geoffrey J. Gordon, "Relational Learning via Collective Matrix Factorization," International Conference on Knowledge Discovery and Data Mining, School of Computer Science Carnegie Mellon University, Jun. 2008.

Klami et al, "Group-sparse Embeddings in Collective Matrix Factorization," International Conference on Representational Learning, Helsinki Institute for Information Technology HIIT, Department of Information and Computer Science, University of Helsinki, Feb. 18, 2014.

Falk, Kim, "Practical Recommender Systems", Manning Publications, Jul. 24, 2015, 27 pages.

Tanenbaum, Andrew S., "Distributed Systems: Principles and Paradigms (2nd Edition)", Oct. 12, 2006, 87 pages.

Wikipedia, "Mobile device", Apr. 14, 2016, URL https://en.wikipedia.org/w/index.php?title=Mobile_device&oldid=715247550.

European Search Report for corresponding application No. 17151624.8, dated Feb. 21, 2017.

Wikipedia, "Mobile Web", Apr. 25, 2016, URL: http://en.wikipedia.org/w/index.php?title=Mobile_Web&oldid=717024768.

Wikipedia, "Web application", Apr. 27, 2016, URL: http://en.wikipedia.org/w/index.php?title=Web_application&oldid=717355790.

European Office Action issued in corresponding application No. EP 17 151 624.8, dated Dec. 10, 2018.

* cited by examiner

FIG. 2

| | 1 | 2 | ⋯ | $d_2$ |
|---|---|---|---|---|
| 1 | 3 | 2 | ⋯ | 4 |
| 2 | 5 | 4 | ⋯ | 1 |
| ⋮ | ⋮ | ⋮ | ⋮ | ⋮ |
| $d_1$ | 3 | 3 | ⋯ | 5 |

FIG. 3

| | 1 | 2 | ⋯ | $d_2$ |
|---|---|---|---|---|
| 1 | 3.5 | 2.0 | ⋯ | 4.1 |
| 2 | 4.8 | 3.7 | ⋯ | 1.2 |

FIG. 4

| | 1 | 2 | ⋯ | $d_2$ |
|---|---|---|---|---|
| 1 | 2.4 | 1.7 | ⋯ | 4.1 |
| 2 | 2.8 | 2.1 | ⋯ | 3.9 |
| ⋮ | ⋮ | ⋮ | ⋮ | ⋮ |
| $d_1$ | 4.2 | 3.8 | ⋯ | 2.2 |

USER RECOMMENDATION GENERATION

FIELD

The embodiments discussed herein are related to recommendation generation.

BACKGROUND

Modern systems may offer users a relatively large selection of options. For example, systems may offer a vast number of products for sale, movies to watch, songs to listen to, books to read, and the like. These and other systems may employ recommendation systems to provide option recommendations to the users of the system in an attempt to present users with options relevant to the user. Employing an accurate recommendation system may improve user satisfaction with a particular system.

Some recommendation systems may employ collaborative filtering, which may include analyzing relationships amongst users and inter-dependencies among products to identify new user-product associations. The collaborative filtering may include neighborhood methods and latent factor methods.

Neighborhood methods may include computing relationships between users and/or products to evaluate a user's preference for a product. Latent factor methods may attempt to model ratings by characterizing both users and products by a set of factors inferred from rating patterns.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include generating a personalized rating vector associated with a querying user. The personalized rating vector may relate personalized ratings to options. The personalized rating vector may be generated via element-wise multiplication of a user vector, a relevance weight, and a characteristics vector. The user vector may relate user ratings to the querying user and to the options. The relevance weight may be associated with a characteristic of the querying user. The characteristics vector may relate characteristics ratings to a user characteristic and to the options. The user characteristic may correspond at least in part to the characteristic of the querying user. The method may further include generating a recommendation for the querying user based at least in part on the personalized rating vector, the recommendation associated with at least one option of the options of the personalized rating vector The object and advantages of the embodiments will be realized and achieved at least by the elements, features, and combinations particularly pointed out in the claims.

It is to be understood that both the foregoing general description and the following detailed description are exemplary and explanatory and are not restrictive of the claims.

BRIEF DESCRIPTION OF THE DRAWINGS

Example embodiments will be described and explained with additional specificity and detail through the use of the accompanying drawings.

FIG. 2 illustrates an example ratings matrix.

FIG. 3 illustrates an example characteristics matrix.

FIG. 4 illustrates another example characteristics matrix.

DESCRIPTION OF EMBODIMENTS

Figure 1:
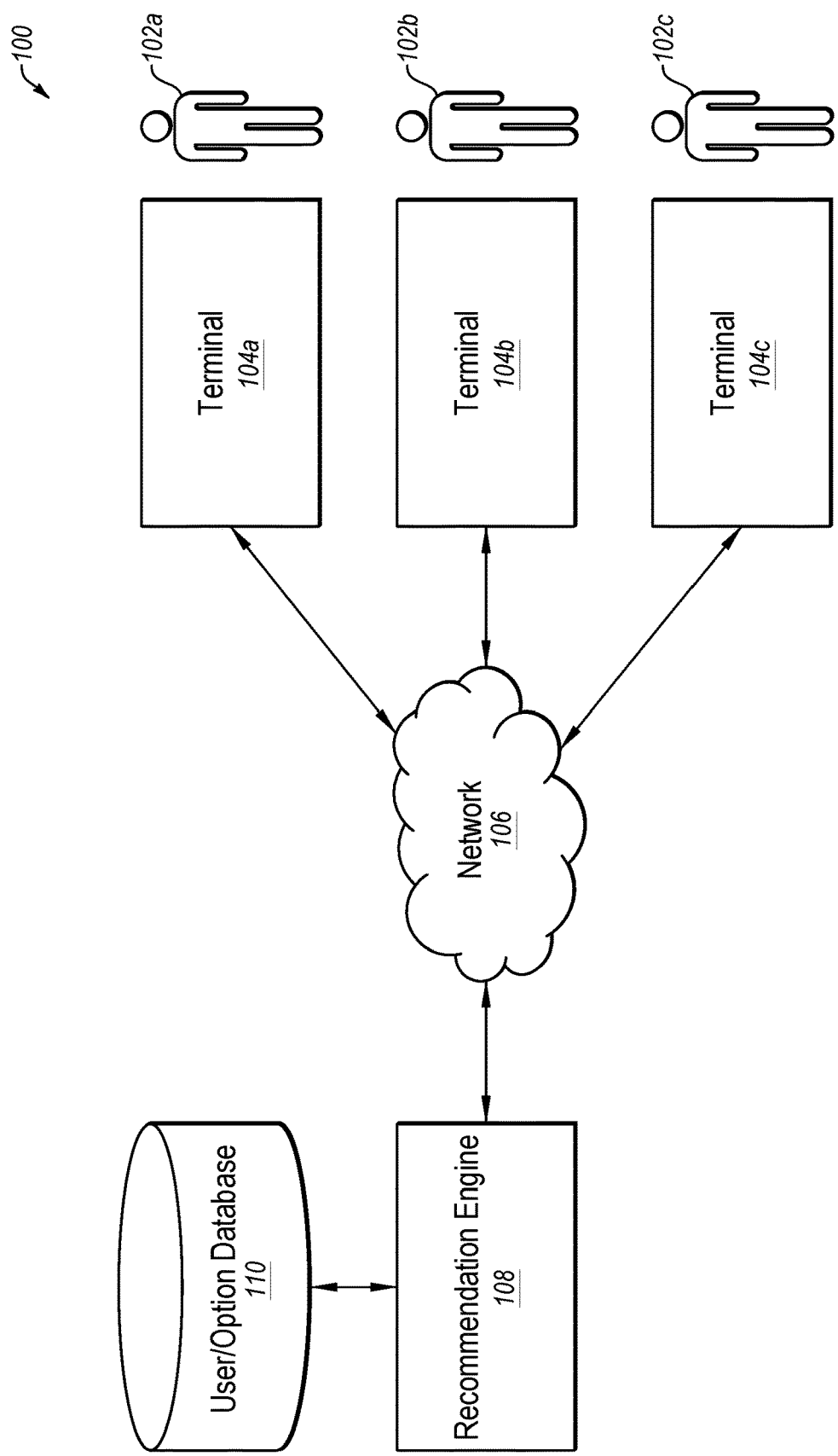
FIG. 1 is a diagram of an example recommendation system.

Latent factor methods for collaborative filtering may include matrix factorization methods. Single-view matrix factorization techniques may provide low-rank representations by approximating a matrix as the outer product of two matrices. For example, an n×d matrix, represented by X, may be represented by two rank-k matrices, such as an n×k matrix, represented by $U\_1$, and a d×k matrix, represented by $U\_2$. Thus, for example, X may be represented by the following equation:

$$X \approx U_1 \otimes U_2 \qquad \text{eq. 1}$$

By way of example, X may contain ratings of an n number of users for a d number of movies. Matrices $U\_1$ and $U\_2$ may contain, respectively, users characterized by a vector of a k number of factors and movies characterized by a vector of the k number of factors inferred from rating patterns. The factors may be described as latent factors. Examples of latent factors may include seriousness, gender appeal, and the like. Such matrix factorization techniques may not capture the influence of more than one factor in influencing a rating. For example, such matrix factorization techniques may not provide for joint modeling of a user-movie, movie-actor, or the like.

Conventional multiple-view (multi-view) matrix factorization techniques may facilitate consideration of multiple factors in influencing a rating. Multi-view matrix factorization may employ matrices that may share the same row entities but differ in the column entities. For example, a first matrix may contain ratings of an n number of users for a $d\_1$ number of movies. A second matrix may contain classifications of the n number of users for a $d\_2$ number of profile features, and the like.

Conventional augmented multi-view collective matrix factorization may include matrices that may complement the multi-view matrices. For example, a first matrix may contain ratings of an n number of users for a $d\_1$ number of movies. A second matrix may contain classifications of a $d\_2$ number of properties for the $d\_1$ number of movies. A third matrix may contain classifications of the $d\_2$ number of properties for the n number of users. Such matrix factorization may treat the matrices as directly related to each other and may treat the latent factors as describing the variation of the employed matrices. For example, if movie genre and movie duration are the latent factors, the collective matrix factorization may treat both genre and duration as equally significant when used for recommending a movie.

Conventional collective matrix factorization via group-sparse embedding may facilitate the use of factors private to arbitrary subsets of matrices by adding a group-wise sparsity constraint, also described as group-sparse embeddings, for the factors in the collective matrix factorization framework. Examples of group-sparse embedding in collective matrix factorization may be described in Klami, et al, *Group-sparse Embeddings in Collective Matrix Factorization*, International Conference on Representational Learning, 2014, which is incorporated herein in its entirety. Such matrix factorization may predict missing values of the relational matrices, but may not feed back the predicted ratings to individual matrices to improve predictions for a particular relation.

Some embodiments discussed herein may extend collective matrix factorization to improve recommendations to a particular user. For example, missing values generated through collective matrix factorization via group-sparse embedding may be employed to personalize user-specific advice recommendations considering elements of a user profile. Considered elements may include an age or an age range of a user, a gender of a user, or the like. Some embodiments may improve accuracy in generating recommendations across users of a recommendation engine. Thus, for example, embodiments may improve recommendation engine technology.

In some embodiments, the extended collective matrix factorization may be configured to generate advice recommendations for a particular user based on characteristics of the particular user. The advice recommendations may include guidance concerning future action. The advice recommendations may be relatively valuable to users in a relatively negative emotional or cognitive state, such as when the use may be experiencing stress, boredom, tiredness, or the like. The advice recommendations may be based on crowd sourced advice ratings. For example, participants may answer queries of a form such as "what to do when {state}." Where "{state}" may represent user states such as "stressed," "tired," "time pressured," "bored," or the like or any combination thereof. Alternately or additionally, participants may be asked to provide ratings for answers to such queries or the like.

Embodiments may not be limited to advice recommendations. For example, embodiments may be configured to generate product and/or activity recommendations, such as recommendations for travel destinations, events, movies, music, books, food, beer, wine, spirits, board games, video games, or the like or any combination thereof. Alternately or additionally, embodiments may be configured to generate recommendations corresponding to projections that may be influenced by multiple, differently weighted factors. For example, embodiments may generate recommendations corresponding to projections of diseases that may be influenced by multiple state of multiple genes; to projections of share values that may be influenced by multiple factors such as government policies, market values, or the like; and/or to projections of individual and/or group social behavior that may be influenced by culture, goals, education, age, gender, geographic location, occupation, or the like.

Embodiments will be explained with reference to the accompanying drawings.

FIG. 1 is a diagram of an example recommendation system 100. The system 100 may include multiple users. For example, the system 100 may include a user 102a, a user 102b, and a user 102c (collectively "users 102"), and additional users. Each of the users may be associated with a terminal. For example, the users 102 may be respectively associated with a terminal 104a, a terminal 104b, and a terminal 104c (collectively "terminals 104").

The terminals 104 may be capable of communicating with and via a network 106, outputting a message, and/or receiving input from a user. For example, the terminals 104 may include a computing device, such as a smartwatch, fitness tracking device, smartglasses, smartphone, desktop computer, laptop computer, tablet computer, smart TV, or the like or any combination thereof. The network 106 may include the internet, a radio-access network, a wide area network, a local area network, a personal area network, or the like or any combination thereof.

The system 100 may include a recommendation engine 108 capable of communicating with the terminals 104 via the network 106. The system 100 may further include a user/option database 110, which may receive and/or provide data from and/or to the recommendation engine 108.

FIG. 2 illustrates an example ratings matrix 200. The matrix 200 may be included in a database generally corresponding to the user/option database 110 of FIG. 1. The matrix 200 may be generated by, populated by, and/or employed by a recommendation engine generally corresponding to the recommendation engine 108 of FIG. 1. In some embodiments, the matrix 200 may be represented as X_1 and may be defined by the following equation.

$$X_1 = [x_{ij}^{(1)}] \qquad \text{eq. 2}$$

Where i and j may represent, respectively, row and column indices of the matrix.

The matrix 200 may relate user ratings 202 to users 204 and options 206. The users 204 may generally correspond to the users 102 of FIG. 1. Alternately or additionally, the users 204 may include users of a different rating system, such as publically available ratings systems, from rating systems for online retail sites, from results of questionnaires, and/or from other ratings databases, or the like. In this and other embodiments, the matrix 200 may relate other information based on the configuration of the system that may employ the matrix 200. For example, each row of the matrix 200 may represent a different user and each column of the matrix 200 may represent a different option. The matrix 200 may represent the ratings 202 associated with a d_1 number of users and a d_2 number of options. In some embodiments, the ratings 202 may reflect a Poisson distribution.

By way of example, a first row of the matrix may be associated with a first user 204a and a first column of the matrix 200 may be associated with a first option 206a. Thus, for example, the rating located at the intersection of the first row and the first column may represent a rating of the first option 206a for the first user 204a, such as a rating of "3," as included in the matrix 200. The rating may have been received by the first user and/or derived via collective matrix factorization. For example, the rating may reflect a rating given by the first user 204a for the first option 206a. The matrix 200 may include user vectors. For example, the first row may be associated with a user vector associated with the first user 204a. The user vector associated with the first user may relate the ratings to the first user 204a and the options 206.

In this and other embodiments, the options 206 may represent advice options. For example, the advice options may include user answers to a query of a form such as "what to do when {state}" where "{state}" may represent user states such as "stressed," "tired," "time pressured," "bored," or the like or any combination thereof. Alternately or additionally, the options may represent travel destinations, events, and/or products, such as movies, music, books, food, beer, wine, spirits, board games, video games, or the like or any combination thereof.

FIG. 3 illustrates an example characteristics matrix 300. The matrix 300 may be included in a database generally corresponding to the user/option database 110 of FIG. 1. The matrix 300 may be generated by, populated by, and/or employed by a recommendation engine generally corresponding to the recommendation engine 108 of FIG. 1. In some embodiments, the matrix 300 may be represented as X_2 and may be defined by the following equation.

$$X_2 = [x_{ij}^{(2)}] \qquad \text{eq. 3}$$

Where i and j may represent, respectively, row and column indices of the matrix.

The matrix 300 may relate ratings 302 to characteristics 304 and options 306. The ratings 302 may represent average ratings for options by characteristics 304 of users generally corresponding to the users 204 of FIG. 2. The options 306 may generally correspond to the options 206 of FIG. 1. For example, each row of the matrix 300 may represent a different gender associated with users generally corresponding to the users 102 of FIG. 1 and each column of the matrix 400 may represent the different options. The matrix 300 may represent the ratings 302 associated with two genders (e.g., male and female) and the d_2 number of options. In some embodiments, the ratings 302 may reflect a Gaussian distribution.

By way of example, a first row of the matrix may be associated with a male gender 304a and a first column of the matrix 300 may be associated with a first option 306a. Thus, for example, the rating located at the intersection of the first row and the first column may represent an average rating of the first option 306a for the users associated with the male gender, such as a rating of "3.5," as included in the matrix 300. The rating may have been received by the users and/or derived via collective matrix factorization. For example, the rating may reflect an average of ratings given by users associated with the male gender 304a for the first option 306a.

FIG. 4 illustrates another example characteristics matrix 400. The matrix 400 may be included in a database generally corresponding to the user/option database 110 of FIG. 1. The matrix 400 may be generated by, populated by, and/or employed by a recommendation engine generally corresponding to the recommendation engine 108 of FIG. 1. In some embodiments, the matrix 400 may be represented as X_3 and may be defined by the following equation.

$$X_3 = [x_{ij}^{(3)}] \qquad \text{eq. 4}$$

Where i and j may represent, respectively, row and column indices of the matrix.

The matrix 400 may relate ratings 402 to characteristics 404 and options 406. The ratings 402 may represent average ratings for options by characteristics 404 of users generally corresponding to the users 204 of FIG. 2. The options 406 may generally correspond to the options 206 of FIG. 1. For example, each row of the matrix 400 may represent a different age range associated with users generally corresponding to the users 102 of FIG. 1 and each column of the matrix 400 may represent the different options. The matrix 400 may represent the ratings 402 associated with a d_3 number of age ranges and the d_2 number of options. In some embodiments, the ratings 402 may reflect a Gaussian distribution.

By way of example, a first row of the matrix may be associated with a first age range 404a, such as 18 years of age to 24 years of age, and a first column of the matrix 400 may be associated with a first option 406a. Thus, for example, the rating located at the intersection of the first row and the first column may represent an average rating of the first option 406a for the users associated with the first age range, such as a rating of "2.4," as included in the matrix 400. The rating may have been received by the users and/or derived via collective matrix factorization. For example, the rating may reflect an average of ratings given by users associated with the first age range 404a for the first option 406a.

The matrices 200, 300, and 400 of FIG. 2-4 are examples matrices and are not limiting of the number and/or configuration of matrices that may be employed. For example, other matrices, such as characteristics matrices for other characteristics of the users and/or characteristics of the options, may be alternately or additionally employed.

Figure 5:
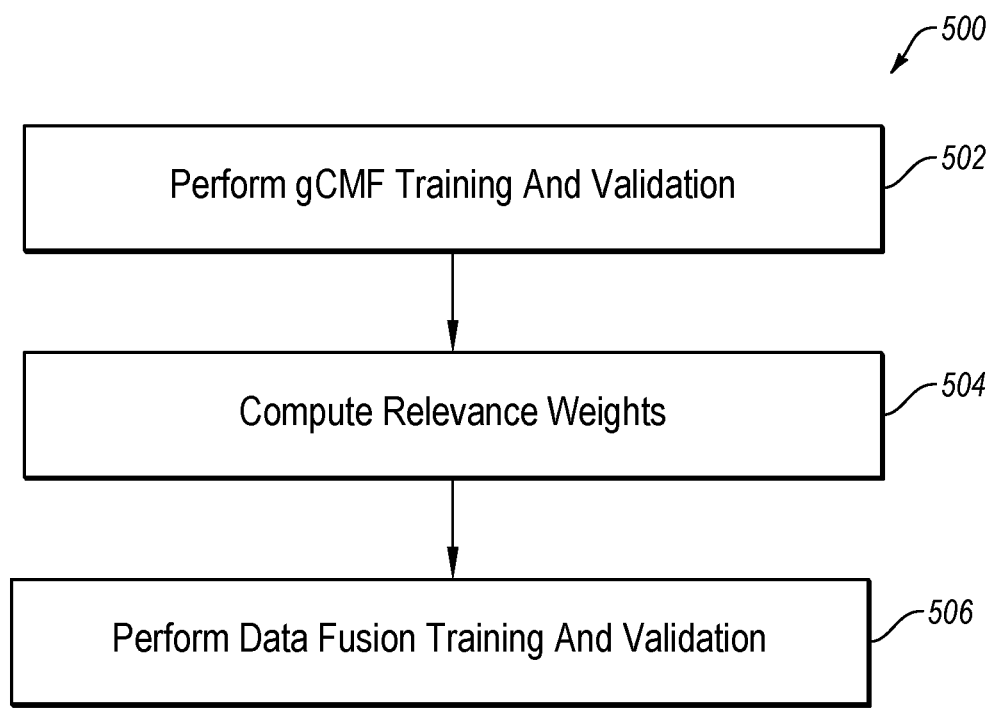
FIG. 5 is a flow chart of an example method.

FIG. 5 is a flow chart of an example method 500 of generating a personalized recommendation. In some embodiments, the method 500 may be performed by the recommendation engine 108 of FIG. 1. The method 500 may begin at block 502 by performing group-wise sparse collective matrix factorization (gCMF) training and validation. User profile data and rating information may be received by a gCMF recommendation module. For example, user/option data may be provided by the user/option database 110 of FIG. 1. Multiple relational matrixes, which may be represented by X_m, may be generated and/or populated. One or more of the relational matrices may generally correspond to one or more of the matrices 200, 300, and/or 400 of FIGS. 2, 3, and/or 4.

Each of the X_m matrices may be approximated by a low rank representation according to the following equation for the element of row i and column j of the m-th matrix.

$$x_{ij}^{(m)} = \Sigma_{k=1}^{K} u_{ik}^{(r_m)} u_{jk}^{(c_m)} + b_i^{(m,r)} + b_j^{(m,c)} + \varepsilon_{ij}^{(m)} \qquad \text{eq. 5}$$

Where k may correspond to the factors, r_m and c_m may correspond, respectively, to the rows and columns of the m-th matrix, b_i and b_j may represent bias terms, and ε_ij may represent element-wise independent noise. A low-rank matrix related to the entity set e, which may include entities such as users, options, and/or characteristics, may be represented by U_e and may be defined according to the following equation.

$$U_e = [u_{ik}^{(e)}] \qquad \text{eq. 6}$$

A single matrix, represented by Y, may contain the X_m matrices such that blocks that may not correspond to any X may be left blank, or unobserved. The matrix Y may be constructed with a d entities, which may be determined according to the following equation.

$$d = \Sigma_{e=1}^{E} d_e \qquad \text{eq. 7}$$

The matrix Y may be formulated as a symmetric matrix factorization according to the following equation.

$$Y = UU^T + \varepsilon \qquad \text{eq. 8}$$

Where U may be a column-wise concatenation of all of the different U_e matrices and ε may be an overall noise term.

If the k-th column of the factor matrices U_e is null for each but two entity types r_m and c_m, the k-th factor may be a private factor for relation m. Group-sparse priors on the columns of U_e may be imposed to facilitate automatic creation of such private factors.

The model may be instantiated by specifying Gaussian likelihood and Gamma priors for the projections, and the following equations may be observed.

$$\varepsilon_{ij}^{(m)} \sim \mathcal{N}(0, \tau_m^{-1}) \qquad \text{eq. 9}$$

$$\tau_m \sim \mathcal{G}(p_0, q_0) \qquad \text{eq. 10}$$

$$u_{ij}^{(m)} \sim \mathcal{N}(0, \alpha_{ek}^{-1}) \qquad \text{eq. 11}$$

$$\alpha_{ek} \sim \mathcal{G}(a_0, b_0) \qquad \text{eq. 12}$$

Where e may be the entity set that contains entity i.

The prior for U may automatically select, for each factor, a set of matrices for which the prior is active. Precision values, represented by α_ek, may be learned for factors k that may not be needed for modeling variation of entity set e.

Variational Bayesian approximation may be used to learn the model parameters. Alternately or additionally, an error of the training and validation may be calculated. If the error is within a threshold, the method 500 may continue to block 504. If the error is outside of the threshold, the method 500 may continue with the gCMF training and validation until the error falls within the threshold.

At block 504, the method 500 may continue by computing relevance weights for the entity sets. The relevance weights may be computed from precision values of private factors for the entity set under consideration. In some embodiments, the relevance weight associated with a particular entity p, which may be represented by W_p, may be computed according to the following expression.

$$W_p = \frac{1}{\left(\sum_k \alpha_{pk}\right)^{\mu p}} \qquad \text{eq. 13}$$

Where α_pk may represent a precision associated with the particular entity p for the private factor k. The precision α_pk may correspond to the precision values of equation 12 associated with the particular entity p. Alternately or additionally, μp may represent a scaling factor associated with the particular entity p. The scaling factor μp may be determined by training and validation.

The method 500 may continue to block 506 by performing data fusion training and validation. In some embodiments, a user vector of a ratings matrix having predicted ratings for each user may be multiplied, via element-wise matrix multiplication, by the relevance weight for an entity set under consideration and by a characteristics vector of a characteristics matrix associated with a particular entity of the entity set. The user vector may generally correspond to a row vector of the ratings matrix generally corresponding to the ratings matrix 200 of FIG. 2. The characteristics vector may generally correspond to a row vector of the characteristics matrix generally corresponding to the characteristics matrices 300 and 400 of FIGS. 3 and 4. By way of example, the portion of the characteristics matrix may include a vector associated with a particular gender, such as female, of a gender characteristics matrix, or the like.

Alternately or additionally, an error of the data fusion training and validation may be calculated. If the error is within a threshold, the method 500 may conclude. If the error is outside of the threshold, the method may continue with data fusion training and validation until the error falls within the threshold.

Figure 6:
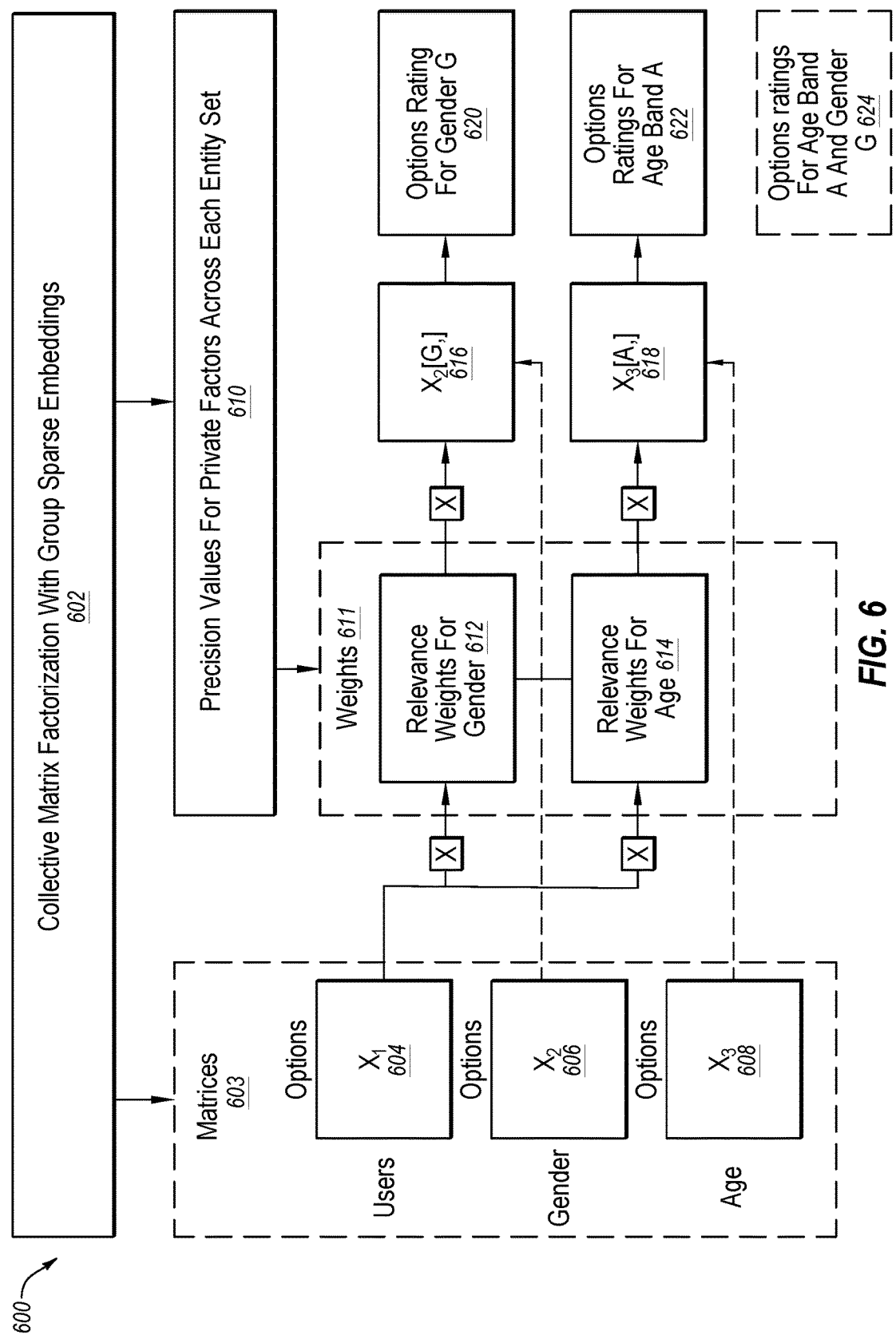
FIG. 6 is a block diagram of an example data fusion process.

FIG. 6 is a block diagram of an example data fusion process 600 that may generally correspond to the data fusion of the method 500 of FIG. 5. The process 600 may include a collective matrix factorization with group-sparse embeddings, which may generate matrices 603 and precision values for private factors across each entity set 610. The collective matrix factorization with group-sparse embeddings may generally correspond to the collective matrix factorization of the method 500 of FIG. 5.

The matrices 603 may include a ratings matrix 604, represented as X_1. The ratings matrix 604 may generally correspond to the ratings matrix 200 of FIG. 2. The ratings matrix 604 may relate user ratings to users and options. Alternately or additionally, the matrices 603 may include a characteristics matrix 606, represented as X_2. The characteristics matrix 606 may generally correspond to the characteristics matrix 300 of FIG. 3. The characteristics matrix 606 may relate ratings for options to characteristics of the users, such as gender of the users. Alternately or additionally, the matrices 603 may include a characteristics matrix 608, represented as X_3. The characteristics matrix 608 may generally correspond to the characteristics matrix 400 of FIG. 4. The characteristics matrix 608 may relate ratings for options to characteristics of the users, such as age bands of the users. Other characteristics matrices may alternately or additionally relate ratings for options to characteristics of the user other than age and/or gender.

Relevance weights 611 may be generated from the precision values for private factors across each entity set 610. The generated weights may include relevance weights for gender 612 and/or relevance weights for age 614.

In some embodiments, the relevance weight for gender 612, which may be represented by W_g, may be computed according to the following expression.

$$W_g = \frac{1}{\left(\sum_k \alpha_{gk}\right)^{\mu g}} = \left(\sum_k \alpha_{gk}\right)^{-\mu g} \qquad \text{eq. 14}$$

Where α_gk may represent a precision associated with gender g for the private factor k. The precision α_gk may correspond to the precision values of equation 12 associated with gender g. Alternately or additionally, μg may represent a scaling factor associated with gender g. The scaling factor μg may be determined by training and validation.

Alternately or additionally, the relevance weight for age 614, which may be represented by W_a, may be computed according to the following expression.

$$W_a = \frac{1}{\left(\sum_k \alpha_{ak}\right)^{\mu a}} = \left(\sum_k \alpha_{ak}\right)^{-\mu a} \qquad \text{eq. 15}$$

Where α_ak may represent a precision associated with age a for the private factor k. The precision α_ak may correspond to the precision values of equation 12 associated with age a. Alternately or additionally, μa may represent a scaling factor associated with age a. The scaling factor μa may be determined by training and validation. Weights for characteristics other than gender and/or age may alternately or additionally be determined.

The data fusion process 600 may include multiplying a user vector of the ratings matrix 604 by the relevance weight for gender 612 and by a gender vector 616. The user vector may be associated with the querying user. The gender vector 616 may be represented by X_2[G,] where G may represent the gender entity of the characteristics matrix 606 associated with the gender of the querying user. For example, a personalized rating vector associated with the gender G 620 may be generated. The gender G may be associated with the gender of the querying user.

The user vector, the relevance weight for gender 612, and the gender vector 616 may be multiplied via element-wise multiplication, which may be indicated by the "x" box symbol 615. The element-wise multiplication of the user vector, the relevance weight for gender 612, and the gender vector 616 may result in a personalized rating vector associated with gender. By way of example, a first personalized rating of the personalized rating vector associated with the gender G 620 may be equal to the product of a first rating of the user vector multiplied by the relevance weight for gender 612 and a first rating of the gender vector 616.

Alternately or additionally, the data fusion process 600 may include multiplying the user vector of the ratings matrix 604 by the relevance weight for age 614 and an age vector 618 to generate a personalized rating vector associated with the age band A 622. The age vector 618 may be represented by X_3 [A,] where A may represent the age entity of the characteristics matrix 608 associated with the age of the querying user. The age band A may be associated with the age of the querying user.

By way of example, if a querying user is a 20-year old female, the characteristic-weighed matrix for gender may be multiplied via element-wise multiplication by a vector of the characteristics matrix 606 corresponding to the female gender and the characteristic-weighted matrix for age may be multiplied via element-wise multiplication by a vector of the characteristics matrix 608 corresponding to an age band associated with 20-year olds.

Put another way, a personalized rating vector for gender G may be determined according to the following equation.

$$\text{user\_advice\_rating\_gender}_G = X_1[U,] * \frac{1}{\left(\sum_k \alpha_{gk}\right)^{\mu g}} * X_2[G,] \qquad \text{eq. 16}$$

Where X_1[U,] may denote a user vector of the ratings vector, U may represent the querying user, "*" may denote element-wise multiplication and α_gk may represent a precision associated with gender g for the private factor k. The precision α_gk may correspond to the precision values of equation 12 associated with gender g. Alternately or additionally, μg may represent a scaling factor associated with gender g.

Alternately or additionally, a personalized rating vector for age A may be determined according to the following equation.

$$\text{user\_advice\_rating\_age}_A = X_1[U,] * \frac{1}{\left(\sum_k \alpha_{ak}\right)^{\mu a}} * X_3[A,] \qquad \text{eq. 17}$$

Where X_1[U,] may denote a user vector of the ratings vector, U may represent the querying user, "*" may denote element-wise multiplication and α_ak may represent a precision associated with age a for the private factor k. The precision α_ak may correspond to the precision values of equation 12 associated with age a. Alternately or additionally, μa may represent a scaling factor associated with age a.

Alternately or additionally, a personalized rating vector associated with the age band A and the gender G 624 may be generated. For example, a user advice rating for age A and gender G may be determined according to the following equation.

$$\text{UAR\_age}_A\text{\_gen}_G = \qquad \text{eq. 18}$$
$$\sqrt{X_1[U,] * \frac{1}{\left(\sum_k \alpha_{ak}\right)^{\mu a}} * X_3[A,] * X_1[U,] * \frac{1}{\left(\sum_k \alpha_{gk}\right)^{\mu g}} * X_2[G,]}$$

Where the square root may be an element-wise square root and the symbols may be defined as described with reference to equations 16 and 17. Other user advice ratings for multiple characteristics may be similarly determined. In some embodiments, a personalized rating vector may account for additional and/or alternate characteristics. For example, a personalized rating vector may be equal to an element-wise n-th root of n element-wise-multiplied personalized rating vectors associated with n characteristics. In some embodiments, other equations that may maintain relative values of the personalized rating vectors may be employed. For example, the root operation may be omitted and/or the X_1[U,] user vector may be included in the equation once.

Thus, for example, embodiments may leverage user-specific profile information to improve advice recommendations. By way of example, advice recommendations may take into consideration a user's age, gender, and/or other characteristics in determining advice recommendations. Embodiments may leverage other information and may be used to make other selections or analyses. Some embodiments may facilitate medical and/or genetics analysis. For example, embodiments may facilitate analysis of the contribution of multiple genes in disease prediction. Alternately or additionally, embodiments may facilitate financial trade analysis. For example, embodiments may facilitate understanding of the effects and inter-dependencies of multiple factors, such as government policy, market value, or the like, for share value prediction. Alternately or additionally, embodiments may facilitate social behavior analysis. For example, embodiments may facilitate predicting behavioral outcomes of groups and individuals taking into account dependencies between various factors such as culture, goals, education, or the like.

For this and other processes and methods disclosed herein, the functions performed in the processes and methods may be implemented in differing order. Furthermore, the outlined operations are provided only as examples, and some of the operations may be optional, combined into fewer operations, or expanded into additional operations without detracting from the essence of the embodiments.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. By way of example, a non-transitory computer-readable medium may have encoded therein programming code executable by a processor to implement the recommendation engine 108 and/or the user/option database 110 of FIG. 1, the method 500 of FIG. 5, and/or the process 600 of FIG. 6. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated.

All examples and conditional language recited herein are intended for pedagogical objects to aid the reader in understanding the embodiments and the concepts contributed to furthering the art, and are to be construed as being without limitation to such specifically recited examples and conditions. Although embodiments have been described in detail, various changes, substitutions, and alterations could be made hereto without departing from the scope of the embodiments.

What is claimed is:

1. A method comprising:

generating a personalized rating vector associated with a querying user, the personalized rating vector relating personalized ratings to options, the personalized rating vector generated via element-wise multiplication of:

a user vector relating user ratings to the querying user and to the options, wherein:

the user vector corresponds to a portion of a ratings matrix associated with the querying user, the ratings matrix relates users ratings of users to the options of the personalized rating vector, and the users associated with the users ratings include the querying user;

a relevance weight associated with a characteristic of the querying user; and a characteristics vector relating characteristics ratings to a user characteristic and to the options, the user characteristic corresponding at least in part to the characteristic of the querying user, wherein the personalized rating vector is equal to the following expression:

$$X_E[U,]*(\Sigma_k \alpha_{pk})^{-\mu s}*X_C[C,]$$

where "*" represents element-wise multiplication, $X_E$ represents the ratings matrix, $X_E[U,]$ represents the user vector, U represents the querying user, $(\Sigma_k \alpha_{pk})^{-\mu s}$ represents the relevance weight, k represents private factors, $\alpha_{pk}$ represents corresponding precisions associated with the private factors, $\mu s$ represents a scaling factor, $X_C$ represents a characteristics matrix including the characteristics vector, the characteristics matrix relating characteristics ratings to users characteristics and to the options, the users characteristics including the user characteristic, $X_C[C,]$ represents the characteristics vector, and C represents the user characteristic; and generating a recommendation for the querying user based at least in part on the personalized rating vector, the recommendation associated with at least one option of the options of the personalized rating vector.

2. The method of claim 1, further comprising:

constructing partial relational matrices having missing values;

collectively factorizing the partial relational matrices; and generating complete relational matrices including predictions for the missing values of the partial relational matrices, the complete relational matrices including the ratings matrix and the characteristics matrix.

3. The method of claim 2, wherein the constructing the partial relational matrices, the collectively factorizing the partial relational matrices, and the generating the complete relational matrices are performed based at least in part on collective matrix factorization with group-sparse embeddings.

4. The method of claim 1, wherein the users characteristics include age bands of the users and the user characteristic includes an age band corresponding to an age of the querying user.

5. The method of claim 1, wherein the users characteristics include genders of the users and the user characteristic includes a gender corresponding to a gender of the querying user.

6. The method of claim 1, wherein the personalized rating vector includes a first personalized rating vector, the relevance weight includes a first relevance weight, the characteristic of the querying user includes a first characteristic of the querying user, the characteristics vector includes a first characteristics vector, the user characteristic includes a first user characteristic, the method further comprising:

generating a second personalized rating vector associated with the querying user, the second personalized rating vector relating personalized ratings to the options of the first personalized rating vector, the second personalized rating vector generated via element-wise multiplication of:

the user vector;

a second relevance weight associated with a second characteristic of the querying user; and a second characteristics vector relating characteristics ratings to a second user characteristic and to the options, the second user characteristic corresponding at least in part to the second characteristic of the querying user.

7. The method of claim 6, further comprising generating the recommendation for the querying user further based at least in part on a third personalized rating vector based, at least in part, on element-wise multiplication of the first personalized rating vector and the second personalized rating vector.

8. The method of claim 7, wherein the third personalized rating vector is equal to the following expression:

$$\sqrt{X_E[U,]*\left(\sum_k \alpha_{p1k}\right)^{-\mu s1} *X_{C1}[C1,]*X_E[U,]*\left(\sum_k \alpha_{p2k}\right)^{-\mu s2}*X_{C2}[C2,]}$$

where "*" represents element-wise multiplication, $X_E$ represents the ratings matrix, $X_E[U,]$ represents the user vector, U represents the querying user, $(\Sigma_k \alpha_{p1k})^{-\mu s1}$ represents the first relevance weight, k represents private factors, $\alpha_{p1k}$ represents precisions associated with the first user characteristic for the private factors, µs1 represents a first scaling factor associated with the first characteristic, $X_{C1}$ represents a first characteristics matrix including the first characteristics vector, the first characteristics matrix relating characteristics ratings to first users characteristics and to the options of the first personalized rating vector, the first users characteristics including the first user characteristic, $X_{C1}[C1,]$ represents the first characteristics vector, C1 represents the first user characteristic, $(\Sigma_k \alpha_{p2k})^{-\mu s2}$ represents the second relevance weight, $\alpha_{p2k}$ represents precisions associated with the second user characteristic for the private factors, µs2 represents a second scaling factor associated with the second characteristic, $X_{C2}$ represents a second characteristics matrix including the second characteristics vector, the second characteristics matrix relating characteristics ratings to second users characteristics and to the options of the first personalized rating vector, the second users characteristics including the second user characteristic, $X_{C2}[C2,]$ represents the second characteristics vector, and C2 represents the second user characteristic.

9. The method of claim 8, wherein:
the first user characteristic includes an age band corresponding to an age of the querying user; and
the second user characteristic includes a gender corresponding to a gender of the querying user.

10. The method of claim 8, further comprising:
constructing partial relational matrices having missing values;
collectively factorizing the partial relational matrices; and
generating complete relational matrices including predictions for the missing values of the partial relational matrices, the complete relational matrices including the ratings matrix, the first characteristics matrix, and the second characteristics matrix.

11. The method of claim 10, wherein the constructing the partial relational matrices, the collectively factorizing the partial relational matrices, and the generating the complete relational matrices are performed based at least in part on collective matrix factorization with group-sparse embeddings.

12. A non-transitory computer-readable medium having encoded therein programming code executable by a processor to perform operations comprising:
generating a personalized rating vector associated with a querying user, the personalized rating vector relating personalized ratings to options, the personalized rating vector generated via element-wise multiplication of:
a user vector relating user ratings to the querying user and to the options, wherein:
the user vector corresponds to a portion of a ratings matrix associated with the querying user,
the ratings matrix relates users ratings of users to the options of the personalized rating vector, and
the users associated with the users ratings include the querying user;
a relevance weight associated with a characteristic of the querying user; and
a characteristics vector relating characteristics ratings to a user characteristic and to the options, the user characteristic corresponding at least in part to the characteristic of the querying user, wherein the personalized rating vector is equal to the following expression:

$$X_E([U,]*(\Sigma_k \alpha_{pk})^{-\mu s}*X_C[C,]$$

where "*" represents element-wise multiplication, $X_E$ represents the ratings matrix, $X_E[U,]$ represents the user vector, U represents the querying user, $(\Sigma_k \alpha_{pk})^{-\mu s}$ represents the relevance weight, k represents private factors, $\alpha_{pk}$ represents corresponding precisions associated with the private factors, µs represents a scaling factor, $X_C$ represents a characteristics matrix including the characteristics vector, the characteristics matrix relating characteristics ratings to users characteristics and to the options, the users characteristics including the user characteristic, $X_C[C,]$ represents the characteristics vector, and C represents the user characteristic; and
generating a recommendation for the querying user based at least in part on the personalized rating vector, the recommendation associated with at least one option of the options of the personalized rating vector.

13. The computer-readable medium of claim 12, wherein the personalized rating vector includes a first personalized rating vector, the relevance weight includes a first relevance weight, the characteristic of the querying user includes a first characteristic of the querying user, the characteristics vector includes a first characteristics vector, the user characteristic includes a first user characteristic, the operations further comprising:
generating a second personalized rating vector associated with the querying user, the second personalized rating vector relating personalized ratings to the options of the first personalized rating vector, the second personalized rating vector generated via element-wise multiplication of:
the user vector;
a second relevance weight associated with a second characteristic of the querying user; and
a second characteristics vector relating characteristics ratings to a second user characteristic and to the options, the second user characteristic corresponding at least in part to the second characteristic of the querying user.

14. The computer-readable medium of claim 13, further comprising generating the recommendation for the querying user further based at least in part on a third personalized rating vector based, at least in part, on element-wise multiplication of the first personalized rating vector and the second personalized rating vector.

15. The computer-readable medium of claim 14, wherein the third personalized rating vector is equal to the following expression:

$$\sqrt{X_E[U,]*\left(\sum_k \alpha_{p1k}\right)^{-\mu s1}*X_{C1}[C1,]*X_E[U,]*\left(\sum_k \alpha_{p2k}\right)^{-\mu s2}*X_{C2}[C2,]}$$

where "*" represents element-wise multiplication, $X_E$ represents the ratings matrix, $X_E[U,]$ represents the user vector, U represents the querying user, $(\Sigma_k \alpha_{p1k})^{-\mu s1}$ represents the first relevance weight, k represents private factors, $\alpha_{p1k}$ represents precisions associated with the first user characteristic for the private factors, µs1 represents a first scaling factor associated with the first characteristic, $X_{C1}$ represents a first characteristics matrix including the first characteristics vector, the first characteristics matrix relating characteristics ratings to first users characteristics and to the options of the first personalized rating vector, the first users characteristics including the first user characteristic, $X_{C1}[C1,]$ represents the first characteristics vector, C1 represents the first user characteristic, $(\Sigma_k \alpha_{p2k})^{-\mu s2}$ represents the second relevance weight, $\alpha_{p2k}$ represents precisions associated with the second user characteristic for the private factors, µs2 represents a second scaling factor associated with the second characteristic, $X_{C2}$ represents a second characteristics matrix including the second characteristics vector, the second characteristics matrix relating characteristics ratings to second users characteristics and to the options of the first personalized rating vector, the second users characteristics including the second user characteristic, $X_{C2}[C2,]$ represents the second characteristics vector, and C2 represents the second user characteristic.

16. The computer-readable medium of claim 15, wherein:
the first user characteristic includes an age band corresponding to an age of the querying user; and
the second user characteristic includes a gender corresponding to a gender of the querying user.

17. The computer-readable medium of claim 15, further comprising:
constructing partial relational matrices having missing values;
collectively factorizing the partial relational matrices; and
generating complete relational matrices including predictions for the missing values of the partial relational matrices, the complete relational matrices including the ratings matrix, the first characteristics matrix, and the second characteristics matrix.

18. The computer-readable medium of claim 17, wherein the constructing the partial relational matrices, the collectively factorizing the partial relational matrices, and the generating the complete relational matrices are performed based at least in part on collective matrix factorization with group-sparse embeddings.

* * * * *